US008352395B1

(12) United States Patent
Brandt

(10) Patent No.: US 8,352,395 B1
(45) Date of Patent: Jan. 8, 2013

(54) TRAINING AN ATTENTIONAL CASCADE

(75) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 476 days.

(21) Appl. No.: 12/255,560

(22) Filed: Oct. 21, 2008

Related U.S. Application Data

(63) Continuation of application No. 10/898,613, filed on Jul. 22, 2004, now Pat. No. 7,440,930.

(51) Int. Cl.
G06N 5/00 (2006.01)
(52) U.S. Cl. ......................................................... 706/45
(58) Field of Classification Search .................... 706/45
See application file for complete search history.

(56) References Cited

U.S. PATENT DOCUMENTS

| 4,975,969 | A | 12/1990 | Tal |
| 5,164,992 | A | 11/1992 | Turk et al. |
| 5,440,676 | A | 8/1995 | Alappat et al. |
| 5,793,888 | A * | 8/1998 | Delanoy ..................... 382/219 |
| 6,770,441 | B2 | 8/2004 | Dickinson et al. |
| 6,858,394 | B1 | 2/2005 | Chee et al. |
| 7,020,337 | B2 | 3/2006 | Viola et al. |
| 7,024,033 | B2 | 4/2006 | Li et al. |
| 7,033,754 | B2 | 4/2006 | Chee et al. |
| 7,050,607 | B2 | 5/2006 | Li et al. |
| 7,076,473 | B2 | 7/2006 | Moghaddam |
| 7,194,114 | B2 | 3/2007 | Schneiderman |
| 7,274,832 | B2 | 9/2007 | Nicponski |
| 7,286,707 | B2 | 10/2007 | Liu et al. |
| 7,421,114 | B1 | 9/2008 | Brandt |
| 7,440,587 | B1 | 10/2008 | Bourdev |
| 7,440,930 | B1 | 10/2008 | Brandt |
| 2003/0110147 | A1 | 6/2003 | Li et al. |
| 2004/0066966 | A1 | 4/2004 | Schneiderman |
| 2004/0186816 | A1 | 9/2004 | Lienhart et al. |
| 2005/0102246 | A1 | 5/2005 | Movellan et al. |
| 2006/0062451 | A1 | 3/2006 | Li et al. |
| 2006/0147107 | A1 | 7/2006 | Zhang et al. |
| 2006/0222239 | A1 | 10/2006 | Bargeron et al. |
| 2006/0248029 | A1 | 11/2006 | Liu et al. |
| 2007/0101269 | A1 | 5/2007 | Hua et al. |
| 2007/0110308 | A1 | 5/2007 | Hwang et al. |
| 2008/0095445 | A1 | 4/2008 | Brandt |

OTHER PUBLICATIONS

Camus et al. "Reliable and Fast Eye Finding in Close-Up Images", IEEE, pp. 389-394, 2002.

(Continued)

Primary Examiner — Wilbert L Starks
(74) Attorney, Agent, or Firm — Fish & Richardson P.C.

(57) ABSTRACT

Methods and apparatus, including computer program products, implementing techniques for training an attentional cascade. An attentional cascade is an ordered sequence of detector functions, where the detector functions are functions that examine a target image and return a positive result if the target image resembles an object of interest and a negative result if the target image does not resemble the object of interest. A positive result from one detector function leads to consideration of the target image by the next detector function, and a negative result from any detector function leads to rejection of the target image. The techniques include training each detector function in the attentional cascade in sequence starting with the first detector function. Training a detector function includes selecting a counter-example set. Selecting a counter-example set includes selecting only images that are at least a minimum difference from an example set.

42 Claims, 4 Drawing Sheets

OTHER PUBLICATIONS

Crow, "Summed Area Tables for Texture Mapping", SIGGRAPH, 1984.

Feraud et al., "A Fast and Accurate Face Detector Based on Neural Networks", IEEE Transactions on Pattern Analysis and Machine Intelligence, vol. 23, Jan. 2001.

Freund et al., "A Decision-Theoretic Generalization of On-Line Learning and an Application to Boosting", Journal of Computer and System Sciences 55:119-139, 1997.

Fukai et al., "Facial Feature Point Extraction Method Based on Combination of Shape Extraction and Pattern Matching".

Heisele et al., "Hierarchical Classification and Feature Reduction for Fast Face Detection with Support Vector Machines", Pattern Recognition, vol. 36, 2003.

Hwang, "Pupil Detection in Photo ID", Image Processing: Algorithms and Systems, III, Proc. of SPIE-IS&T Electronic Imaging, S298:82-87, 2004.

Jones et al., "Model-Based Matching by Linear Combinations of Prototypes," 1995, (pp. 1-9).

Kawaguchi et al., "Iris detection using intensity and edge information", Pattern Recognition 36:549-562, 2003.

King, "A Survey of Methods for Face Detection," Mar. 3, 2003, (pp. 1-32).

Li et al., "FloatBoost Learning and Statistical Face Detection", IEEE Transactions on Pattern Analysis and Machine Intelligence, vol. 26, Sep. 2004.

Lin, et al., "Fast Object Detection with Occlusions," Institute of Information Science, Academia Sinica, Nankang, Taipei, Taiwan, 2004 (pp. 402-413).

Luo et al., "An Efficient Automatic Red-Eye Detection and Correction Algorithm", Proceedings of the 17th International Conference on Pattern Recognition (ICPR'04), 4 pages.

Meir et al., "An Introduction to Boosting and Leveraging", Department of Electrical Engineering, Research School of Information Sciences and Engineering, Technion, Haifa 3200, Israel. Downloaded from the Internet, URL: <http://www-ee.technion.ac.il/!~meir>, 66 pages, 2003.

Rizon et al., "Automatic Eye Detection Using Intensity and Edge Information", IEEE, pp. II415-420, 2000.

Rosenfeld et al., "Coarse-to-Fine Template Marching", IEEE Trans. Syst. Man Cybernet, vol. 2, 1997.

Rowley et al., "Neural Network-Based Face Detection", IEEE Pattern Analysis and Machine Intelligence, vol. 20, 1998.

Sahbi et al., "Coarse-to-Fine Support Classifiers for Face Detection", ICPR, 2002.

Scassellati, "Eye Finding via Face Detection for a Foveated, Active Vision System", Proceedings of 15th National Conference of Artificial Intelligence, 1998.

Schapire et al., "Boosting the margin: a new explanation for the effectiveness of voting methods", Proc. 14th Intl. Conf. Machine Learning, pp. 322-330, 1997.

Schapire et al., "Improved Boosting Algorithms Using Confidence-Rated Predictions", Proceedings of the 11th Annual Conference of Computational Learning Theory, pp. 80-91, 1998.

Schapire, "The Boosting Approach to Machine Learning", Princeton University, downloaded from the Internet, URL: <www.cs.princeton.edu/~schapire>, 32 pages, 2002.

Schapire, "The Strength of Weak Learnability", Machine Learning 5:197-227, 1990.

Schneiderman et al., "Object Detection Using the Statistics of Parts", International Journal of Computer Vision, 2002.

Schneiderman, "A Statistical Approach to 3D Object Detection Applies to Faces and Cars", Ph.D. Thesis, CMI, May 2000.

Schneiderman, "Feature centric evaluation for efficient cascaded object detection", IEEE Conf. Computer Vision and Pattern Recognition, 2004.

Smolka et al., "Towards automatic redeye effect removal", Pattern Recognition Letters 24:1767-1785, 2003.

Sobottka et al., "A novel method for automatic face segmentation facial feature extraction and tracking", Signal Processing: Image Communication 12:263-281, 1998.

Sun et al., "Automatic cascade training with perturbation bias", IEEE Conf. Computer Vision and Pattern Recognition, 2004.

Sun et al., "Quantized Wavelet Features and Support Vector Machines for On-Road Vehicle Detection", Seventh International Conference on Control, Automation, Robotics and Vision, 2002.

Valiant, "A Theory of the Learnable", Comm. ACM 27(11):1134-1142, 1984.

Viola et al., "Rapid Object Detection Using a Boosted Cascade of Simple Features" Conference on Computer Vision and Pattern Recognition 2001, (pp. 1-9).

Viola et al., "Robust Real-Time Object Detection," Second International Workshop on Statistical and Computational Theories of Vision—Modeling, Learning, Computing, and Sampling, Vancouver, Canada, Jul. 31, 2001 (pp. 1-20).

Wu et al., "Learning a Rare Event Detection Cascase by Direct Feature Selection," College of Computing and GVU Center, Georgia Institute of Technology, 2003, (pp. 1-8).

Xiao et al., "Boosting Chain Learning for Object Detection," IEEE Computer Society, Proceedings of the Ninth IEEE International Conference on Computer Vision, (ICCV 2003) 2-vol. Set 0-7695-1950-4/03, 7 pages.

Yang et al., "Detecting Faces in Images: A Survey", IEEE Transactions on Pattern Analysis and Machine Intelligence, vol. 24, No. 1, Jan. 2002, 25 pages.

Zhu et al., "A fast automatic extraction algorithm of elliptic object groups from remote sensing images", Pattern Recognition Letters 25:1471-1478, 2004.

* cited by examiner

TRAINING AN ATTENTIONAL CASCADE

CROSS-REFERENCE TO RELATED APPLICATIONS

This application is a continuation application of and claims priority to U.S. patent application Ser. No. 10/898,613 filed on Jul. 22, 2004, now U.S. Pat. No. 7,440,930.

BACKGROUND

The present invention relates to training an attentional cascade, also known as a rejection cascade.

As shown in FIG. 1, an attentional cascade 100 includes a sequence of detector functions 120 trained to recognize whether a given image 110 resembles an object of interest. In this specification, the term image can refer to an entire image, or to a portion of an image. Images are passed from one detector function to the next until they are either accepted 160 as resembling an object of interest, or rejected 150 as not resembling the object of interest. An attentional cascade improves object recognition by quickly rejecting images that are easily recognized as not containing the object of interest, while devoting more computation to more difficult images. The speed of an attentional cascade makes it desirable as compared to other methods for performing object recognition, for example techniques using clustering or neural networks, but this speed comes at the expense of identification accuracy.

One conventional method for training an attentional cascade is known as supervised learning. In supervised learning, a supervised learning program trains each detector function in an attentional cascade in sequence by providing a set of example images and a set of counter-example images to a training algorithm. In each training stage, the supervised learning program draws images randomly from a large collection of counter-examples in order to form a set of counter-examples. The supervised learning program retains only images that pass through previously trained detector functions to serve as counter-examples for subsequent training stages. As this process continues and the number of trained stages increases, the training task for each new stage becomes increasingly difficult because the set of counter-examples consists of only images that passed through previous detector functions as false positives, and are thus hard to discriminate from the object of interest.

SUMMARY

In general, in one aspect, the present invention provides methods and apparatus, including computer program products, implementing techniques for training an attentional cascade. An attentional cascade is an ordered sequence of detector functions, where the detector functions are functions that examine a target image and return a positive result if the target image resembles an object of interest and a negative result if the target image does not resemble the object of interest. A positive result from one detector function leads to consideration of the target image by the next detector function, and a negative result from any detector function leads to rejection of the target image. The techniques include training each detector function in the attentional cascade in sequence starting with the first detector function. Training a detector function includes selecting a counter-example set, where the counter-example set includes images not resembling the object of interest. Selecting a counter-example set includes selecting only images that are at least a minimum difference from an example set, where the example set includes images resembling the object of interest. A detector function is trained using only the example set and the counter-example set.

Particular implementations can include one or more of the following features. The target image can be a portion of a larger image. Selecting a counter-example set includes selecting only images that received a positive result from previous detector functions.

The techniques further include approximating a distance between the example set and images chosen from a universe of counter-examples. The techniques further include approximating the distance using a Euclidean distance. The techniques further include approximating the distance using a geodesic arc length or angle metric. The techniques further include approximating the distance using a Mahalanobis distance. The techniques further include using a subspace determined through statistical analysis of the example set and approximating the distance using a Euclidean distance. The techniques further include using a subspace determined through statistical analysis of the example set and approximating the distance using a geodesic arc length or angle metric. The techniques further include using a subspace determined through statistical analysis of the example set and approximating the distance using a Mahalanobis distance.

The techniques further include approximating a distance using the closest element in the example set to find the distance between the example set and images in the universe of counter-examples. The techniques further include approximating a distance using a clustering algorithm to partition the example set and using the nearest cluster to find distance between the example set and images in the universe of counter-examples. The techniques further include computing the centroid and the covariance of each cluster and using these statistics to compute the Mahalanobis distance to the cluster.

The techniques further include creating a histogram of the distances between the example set and images chosen from the universe of counter-examples and calculating a minimum distance using statistical analysis of the distances. The techniques further include sorting the images chosen from the universe of counter-examples according to their distance from the example set and calculating a minimum distance using statistical analysis of the distances.

The techniques further include a universe of counter-examples includes only images not resembling the object of interest. The techniques further include a universe of counter-examples includes images resembling the object of interest.

The techniques further include receiving a plurality of images, receiving user input requesting identification of images within the plurality of images that contain the object of interest, and performing the requested object detection using the trained attentional cascade.

In general, in another aspect, the present invention provides methods and apparatus, including computer program products, implementing techniques for further training an attentional cascade. The techniques include receiving an attentional cascade that is already trained to return a positive result if a target image is a member of a category of objects and a negative result if the target image is not a member of the category of objects. The attentional cascade is further trained to identify specific objects of interest within the category of object.

Particular implementations can include one or more of the following features. Further training the cascade can include receiving a counter-example set, the counter-example set including images not resembling the specific objects of interest, and training the detector functions using only the example set and the counter-example set, the example set including images resembling the specific objects of interest.

In general, in another aspect, the present invention provides an apparatus that includes an attentional cascade. A detector function in the attentional cascade operates in response to a set of target images. A distribution of the target images that receive a positive result from a detector function resembles a spherical distribution. The distribution of images that receive a positive result from a detector function later in the sequence has a spherical distribution with a smaller radius than the distribution of images that receive a positive result from a detector function earlier in the sequence.

Implementations of the invention can include one or more of the following advantageous features.

The training algorithm is presented with easy to learn counter-examples in early stages of training, while more difficult cases are reserved for later stages of training.

The supervised learning program tends to exclude from training random occurrences of an object of interest that may be present in a counter-example set. Consequently, it is not necessary to exclude such occurrences from the collection of counter-examples.

The supervised learning program produces an ordered approach to sampling non-object images that promotes the construction of highly efficient attentional cascades. It also incorporates the advantages of clustering techniques for object recognition. The trained detector functions have increased efficiency and speed without loss of accuracy.

The details of one or more embodiments of the invention are set forth in the accompanying drawings and the description below. Other features and advantages of the invention will become apparent from the description, the drawings, and the claims.

DETAILED DESCRIPTION

Figure 1:
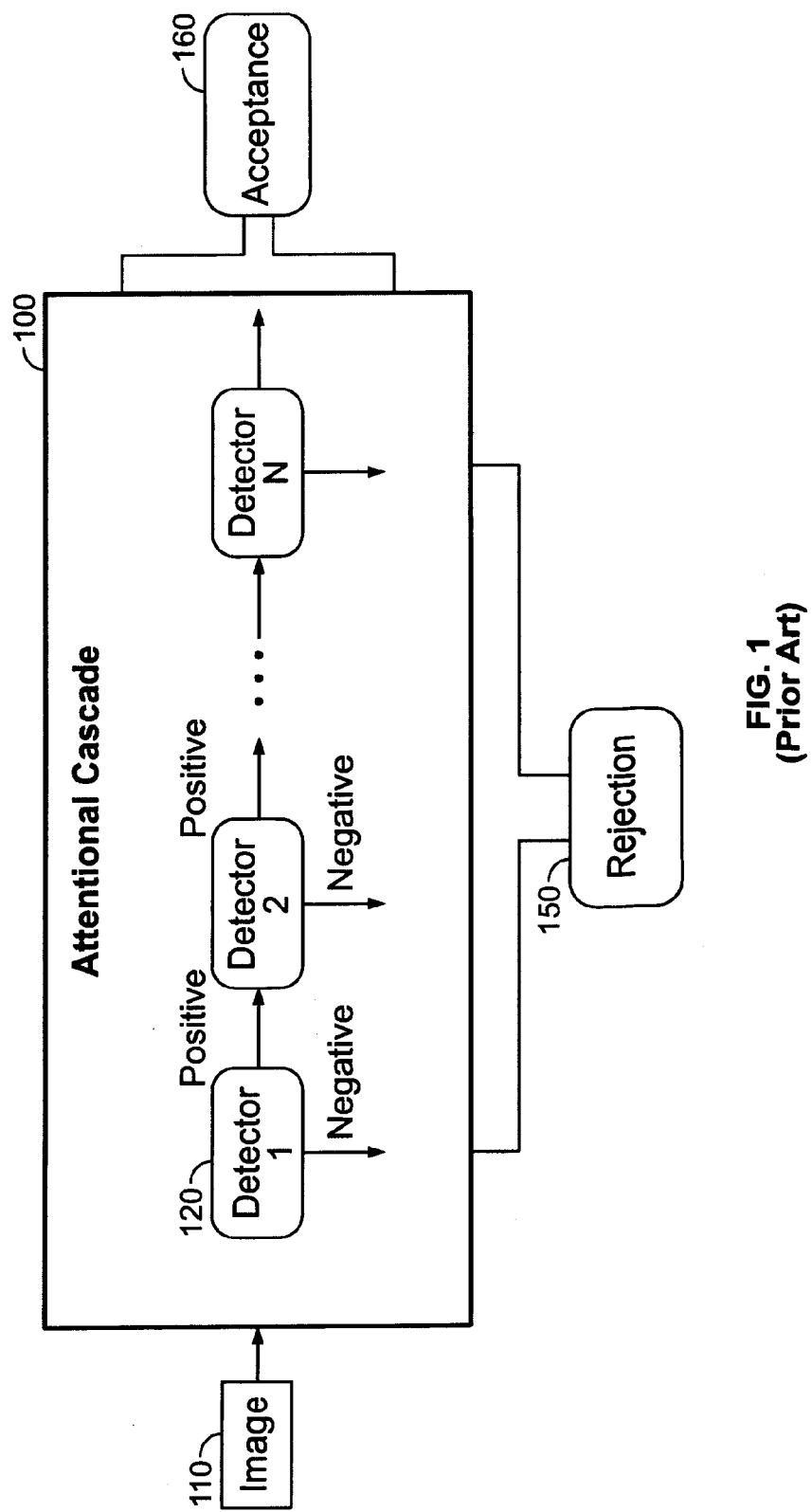
FIG. 1 illustrates the structure of an attentional cascade.
Figure 2:
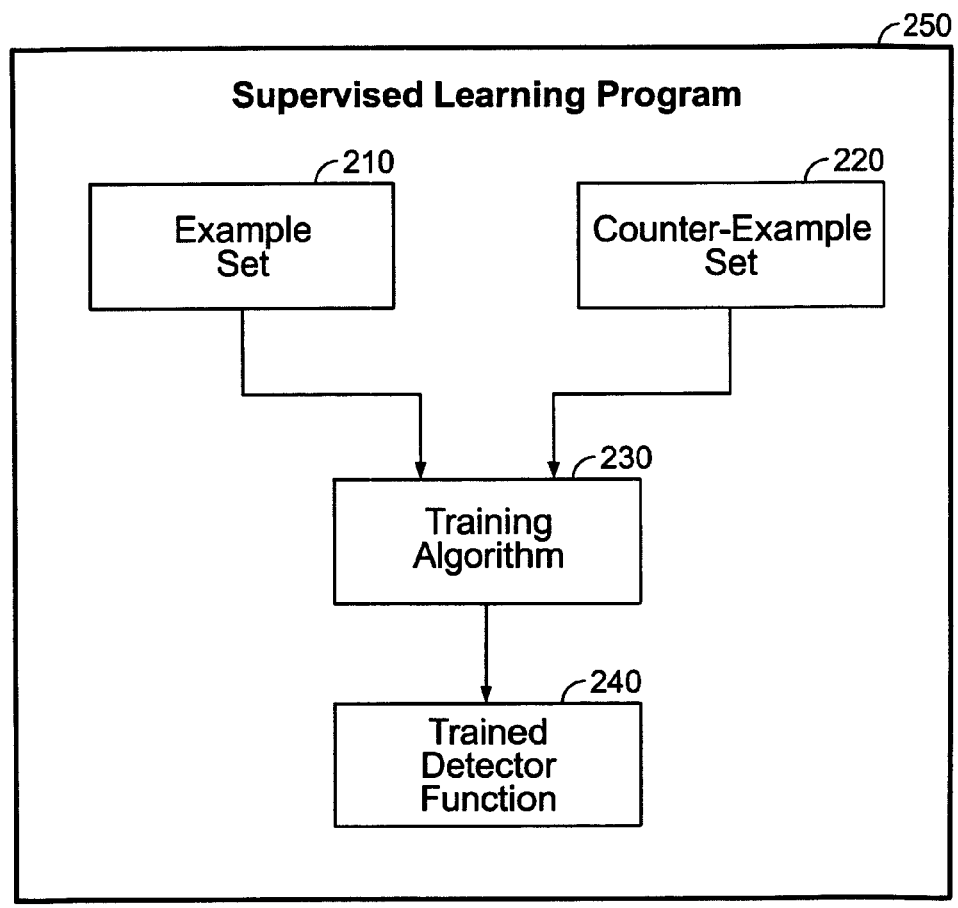
FIG. 2 illustrates a supervised learning program in accordance with the invention.
Figure 3:
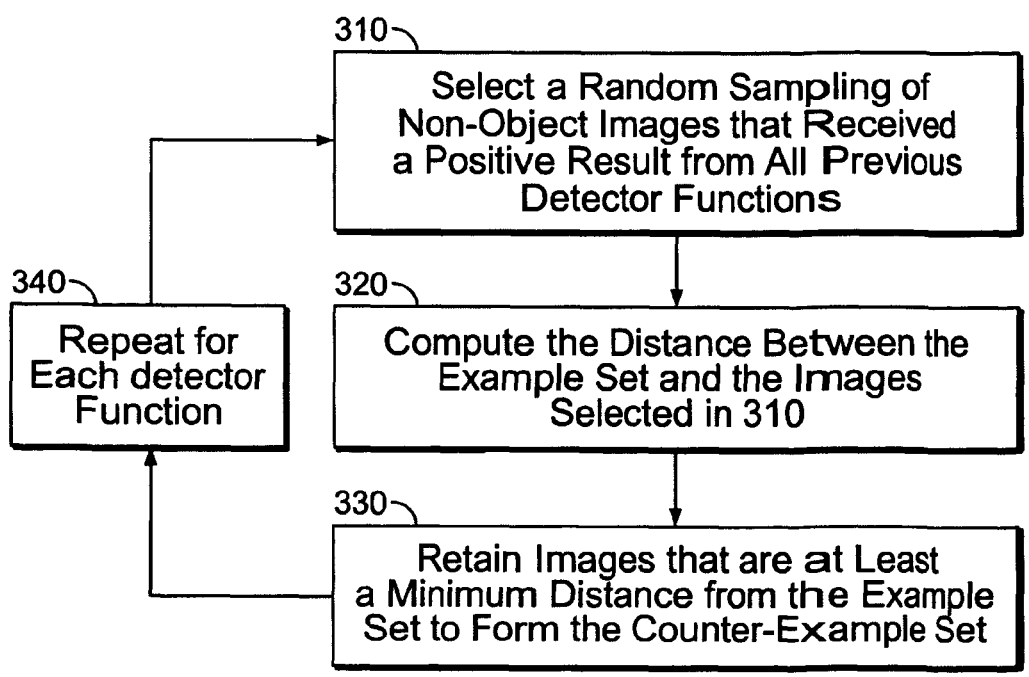
FIG. 3 is a flow diagram of a method for selecting a counter-example set in accordance with the invention.

As shown in FIG. 2, a supervised learning program 250 in accordance with the invention trains a detector function 240 in an attentional cascade by identifying an example set 210 and a counter-example set 220 to serve as inputs for a training algorithm 230.

Figure 4A:
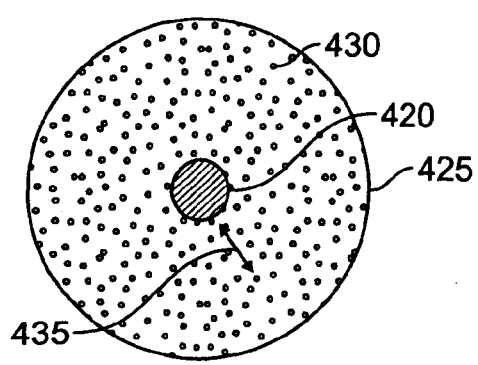
FIGS. 4A-D illustrate selecting a counter-example set.
Like reference numbers and designations in the various drawings indicate like elements.

An example set 210 is a set of images exemplifying an object of interest. FIGS. 3 and 4A-D illustrate a method for identifying a counter-example set 220. As shown in FIG. 4A, the supervised learning program 250 begins by selecting a random sampling of images 430 from a universe of counter-examples 425 (step 310). In one implementation, the universe of counter-examples 425 is a collection of images that does not contain any instances of the object of interest. In an alternative implementation, the universe of counter-examples 425 may include instances of the object of interest.

Figure 4B:
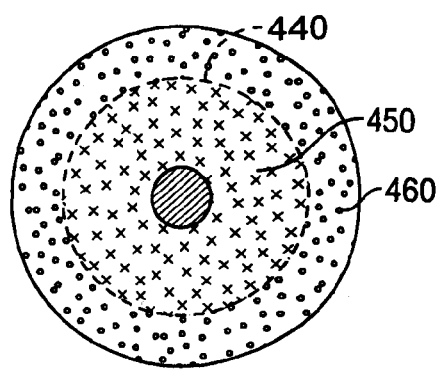

The supervised learning program evaluates the difference 435 between the example set 420 and each randomly selected image 430 using a distance metric (step 320). Images in the universe of counter-examples have a high degree of difference if they are distant from the example set, and a low degree of difference if they are close to the example set. The distance metric will be discussed in more detail below. As shown in FIG. 4B, the supervised learning program retains images 460 that are at least a minimum distance 440 from the example set, and discards images 450 that are not at least a minimum distance 440 from the example set (step 330). The supervised learning program uses the retained images 460 to form a counter-example set, which it then gives to the training algorithm 230.

The minimum distance 440 can be a fixed value, or the supervised learning program can calculate the minimum distance 440 based on the distribution of the chosen counter-example images 430. In one implementation, the supervised learning program uses a histogram of the distances between the example set 420 and the chosen counter-example images 430 to find a minimum distance 440 based on statistical analysis of the distances, for example finding the 50th percentile. In an alternative implementation, the supervised learning program sorts the counter-example images 430 by their distance from the example set 420 to find a minimum distance 440 based on statistical analysis of the distances.

Figure 4C:
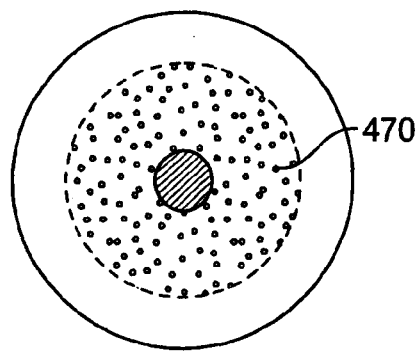
Figure 4D:
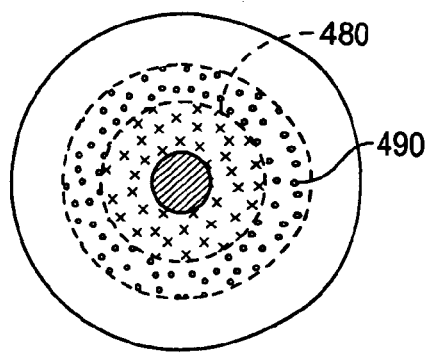

This supervised learning process is repeated for each detector function in the attentional cascade (step 340). For subsequent training rounds, as shown in FIG. 4C, the supervised learning program selects a random sampling of images that received a positive result from previous detector functions 470. As shown in FIG. 4D, the supervised learning program computes a new minimum distance for each training round 480, and retains only those elements that lie outside the minimum distance 490 to form a new counter-example set.

A result of selecting a counter-example set from images that are at least a minimum difference from the example set is that, in general, the supervised learning program presents distant, easy-to-learn images to the training algorithm in early stages, while reserving more difficult, closer images for later stages. This results in trained detector functions that are quick and efficient, with an acceptable accuracy rate. This approach differs from conventional approaches for training an attentional cascade, which either select a random sampling of images during each training stage, or which select difficult images during each training stage.

Another result of selecting only easy-to-learn images to form a counter-example set is that, in general, the supervised learning program will not include occurrences of the object of interest in the counter-example set. The supervised learning program only retains images that are at least a minimum difference from the example set (step 330), and because any occurrences of the object of interest will be very similar and thus close to the example set, the supervised learning program will not include these images in the counter-example set. This allows application of the attentional cascade to images that would be otherwise impractical to exclude from the universe of counter-examples 425, for example simple objects like corners or edges that occur frequently in images.

A supervised learning program evaluates the difference between an example set and images selected from a universe of counter-examples. The difference is approximated by computing a distance between the example set and images in the universe of counter-examples. There are two aspects to computing the distance: selecting a distance metric, and approximating the distance between the example set and images in the universe of counter-examples.

The supervised learning program can use any reasonably designed distance metric to calculate the distance between two images. For example, the distance metric could be geometric or probabilistic in nature.

An image can be treated as a vector in a high-dimensional Euclidean space. Therefore, the supervised learning program can use a Euclidean distance to calculate the distance.

Another method is to normalize each image such that the resulting images have a mean pixel value of zero and a standard deviation of one. This normalization process projects the space of all images onto a lower-dimensional hypersphere. The supervised learning program can then use geodesic arc length as a distance metric, which applies to points constrained to a hypersphere. The arc length is proportional to the angle spanned by two vectors extending from the origin to the two points on the hypersphere representing the two images.

A third option for an underlying metric is to adopt a probabilistic model of the image set, such as a mixture of Gaussians, and derive an appropriate metric such as the Mahalanobis distance for Gaussian distributions.

A fourth option is to apply any of the above three methods to a subspace determined through statistical analysis of the example set. For example, using principal component analysis.

Because the example set is typically not just a single image but rather a collection of images, the supervised learning program can use an approximation in order to calculate the distance between the example set and images in the universe of counter-examples.

One possible approximation is the nearest neighbor method. The object image that is closest to a given non-object image is used in order to evaluate the distance.

In an alternative implementation, the supervised learning program can use a clustering algorithm, for example k-means, to partition the example set into a number of clusters. The supervised learning program can find the centroid of a cluster, and it can evaluate the distance between the centroid and a non-object image. The distance to the example set is the minimum of the distances to each of the centroids.

In another implementation, the supervised learning program can compute the centroid and the covariance of each cluster and use these statistics to compute the Mahalanobis distance to the cluster. The distance to the example set is the minimum of the distances to each of the clusters.

One advantage of using a distance metric combined with methods for approximating the distance between an example set and images in a universe of counter-examples is that the attentional cascade incorporates the accuracy benefits of clustering techniques for object recognition, while retaining the speed and efficiency of an attentional cascade.

An attentional cascade trained using the above-described techniques can be incorporated into a variety of different applications or tools. One such tool is an object identification tool. The object identification tool can be a stand-alone program, or alternatively it can be a component of a larger program. The larger program can be an image processing program, a digital photo management program, or any other program that performs object identification. Such programs can include, for example, Adobe Photoshop® or Album®, available from Adobe Systems Incorporated of San Jose, Calif.

In one example scenario, the object identification tool has been preconfigured to detect a category of objects. For example, the object identification tool could be pre-configured to detect faces, animals, or landscapes in images. The object identification tool performs this object detection using an attentional cascade trained according to the above-described techniques. During use of the object identification tool by a user, the user can further train the tool to identify specific objects within the category of objects. For example, the object identification tool could be trained to identify the faces of the user's family members. As part of the training phase, the user provides the object identification tool with an example set containing images that contain the specific objects to be identified. The user also provides a set of counter-example images, or alternatively, the tool can generate its own set of counter-examples. The tool is then trained using the techniques described above. Subsequently, the trained tool can be used during a detection phase to identify images that contain the specific object of interest. For example, the trained tool can be used to find images in a users's photo album that contain his family members' faces. After detection, the images recognized as containing the specific object can be presented to the user. In one implementation, the user can specify images that are wrongly classified as resembling the specific object, and these wrongly classified images can be used as counter-examples in future training.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A system comprising:
   one or more processors configured to perform operations including:
      training an attentional cascade, the attentional cascade being an ordered sequence of detector functions recorded on a machine-readable storage device, the detector functions being functions that when executed by a computer, examine a target image and return a positive result if the target image resembles an object of interest and a negative result if the target image does not resemble the object of interest, where a positive result from one detector function leads to consideration of the target image by the next detector function and a negative result from any detector function leads to rejection of the target image, wherein training the attentional cascade includes:
      training each detector function in sequence starting with the first detector function, wherein training each detector function includes:
         selecting a counter-example set, the counter-example set including images not resembling the object of interest, wherein selecting the counter-example set includes selecting only images that are at least a minimum difference from an example set of images, the example set including images resembling the object of interest, and where the minimum difference is specified for a distance metric for approximating a distance between particular images and images of the example set of images; and
         training the detector function using only the example set and the counter-example set.

2. The system of claim 1, wherein selecting the counter-example set includes selecting only images that received a positive result from previous detector functions.

3. The system of claim 1, wherein selecting only images that are at least the minimum difference includes approximating the distance between the example set and images chosen from a universe of counter-examples.

4. The system of claim 3, wherein approximating the distance includes using a Euclidean distance.

5. The system of claim 4, wherein approximating the distance includes using a subspace determined through statistical analysis of the example set.

6. The system of claim 3, wherein approximating the distance includes using a geodesic arc length or angle metric.

7. The system of claim 6, wherein approximating the distance includes using a subspace determined through statistical analysis of the example set.

8. The system of claim 3, wherein approximating the distance includes using a Mahalanobis distance.

9. The system of claim 8, wherein approximating the distance includes using a subspace determined through statistical analysis of the example set.

10. The product of claim 3, wherein approximating the distance includes using the closest element in the example set to find the distance between the example set and images in the universe of counter-examples.

11. The system of claim 3, wherein approximating the distance includes using a clustering algorithm to partition the example set and using the nearest cluster to find distance between the example set and images in the universe of counter-examples.

12. The system of claim 11, wherein approximating the distance includes computing the centroid and the covariance of each cluster and using these statistics to compute the Mahalanobis distance to the cluster.

13. The system of claim 3, wherein selecting images that are at least the minimum difference includes creating a histogram of the distances between the example set and images chosen from the universe of counter-examples and calculating a minimum distance using statistical analysis of the distances.

14. The system of claim 3, wherein selecting images that are at least the minimum difference includes sorting images chosen from the universe of counter-examples according to their distance from the example set and calculating a minimum distance using statistical analysis of the distances.

15. The system of claim 3, where the universe of counter-examples includes only images not resembling the object of interest.

16. The system of claim 3, where the universe of counter-examples includes images resembling the object of interest.

17. The system of claim 1, wherein the target image is a portion of a larger image.

18. The system of claim 1, wherein the operations further comprise:
   receiving a plurality of images;
   receiving user input requesting identification of images within the plurality of images that contain the object of interest; and
   performing the requested object detection using the trained attentional cascade.

19. The system of claim 1, where the minimum difference is greater for detector functions early in the sequence than for detector functions later in the sequence.

20. A system comprising:
   one or more processors configured to perform operations including:
      receiving an attentional cascade, the attentional cascade being an ordered sequence of detector functions recorded on a machine-readable storage device, the detector functions being functions that when executed by a computer examine a target image and return a positive result if the target image is a member of a category of objects and a negative result if the target image is not a member of the category of objects, where a positive result from one detector function leads to consideration of the target image by the next detector function and a negative result from any detector function leads to rejection of the target image; and
      further training the received attentional cascade to identify specific objects of interest within the category of objects to generate a trained attentional cascade, the trained attentional cascade being an ordered sequence of detector functions that when executed by a computer examine a target image and return a positive result if the target image is one of the specific objects of interest within the category of objects and a negative result if the target image is not one of the specific objects of interest within the category of objects.

21. The system of claim 20, where further training the attentional cascade includes receiving a counter-example set, the counter-example set including images not resembling the specific objects of interest, and training the detector functions using only the example set and the counter-example set, the example set including images resembling the specific objects of interest.

22. A method comprising:
training an attentional cascade, the attentional cascade being an ordered sequence of detector functions recorded on a machine-readable storage device, the detector functions being functions that when executed by a computer examine a target image and return a positive result if the target image resembles an object of interest and a negative result if the target image does not resemble the object of interest, where a positive result from one detector function leads to consideration of the target image by the next detector function and a negative result from any detector function leads to rejection of the target image, wherein training the attentional cascade includes:
training each detector function in sequence starting with the first detector function, wherein training each detector function includes:
selecting a counter-example set, the counter-example set including images not resembling the object of interest, wherein selecting the counter-example set includes selecting only images that are at least a minimum difference from an example set of images, the example set including images resembling the object of interest, and where the minimum difference is specified for a distance metric for approximating a distance between particular images and images of the example set of images; and
training the detector function using only the example set and the counter-example set.

23. The method of claim 22, wherein selecting the counter-example set includes selecting only images that received a positive result from previous detector functions.

24. The method of claim 22, wherein selecting only images that are at least the minimum difference includes approximating the distance between the example set and images chosen from a universe of counter-examples.

25. The method of claim 24, wherein approximating the distance includes using a Euclidean distance.

26. The method of claim 25, wherein approximating the distance includes using a subspace determined through statistical analysis of the example set.

27. The method of claim 24, wherein approximating the distance includes using a geodesic arc length or angle metric.

28. The method of claim 27, wherein approximating the distance includes using a subspace determined through statistical analysis of the example set.

29. The method of claim 24, wherein approximating the distance includes using a Mahalanobis distance.

30. The method of claim 29, wherein approximating the distance includes using a subspace determined through statistical analysis of the example set.

31. The method of claim 24, wherein approximating the distance includes using the closest element in the example set to find the distance between the example set and images in the universe of counter-examples.

32. The method of claim 24, wherein approximating the distance includes using a clustering algorithm to partition the example set and using the nearest cluster to find distance between the example set and images in the universe of counter-examples.

33. The method of claim 32, wherein approximating the distance includes computing the centroid and the covariance of each cluster and using these statistics to compute the Mahalanobis distance to the cluster.

34. The method of claim 24, wherein selecting images that are at least the minimum difference includes creating a histogram of the distances between the example set and images chosen from the universe of counter-examples and calculating a minimum distance using statistical analysis of the distances.

35. The method of claim 24, wherein selecting images that are at least the minimum difference includes sorting images chosen from the universe of counter-examples according to their distance from the example set and calculating a minimum distance using statistical analysis of the distances.

36. The method of claim 24, where the universe of counter-examples includes only images not resembling the object of interest.

37. The method of claim 24, where the universe of counter-examples includes images resembling the object of interest.

38. The method of claim 22, wherein the target image is a portion of a larger image.

39. The method of claim 22, wherein the operations further comprise:
receiving a plurality of images;
receiving user input requesting identification of images within the plurality of images that contain the object of interest; and
performing the requested object detection using the trained attentional cascade.

40. The method of claim 22, where the minimum difference is greater for detector functions early in the sequence than for detector functions later in the sequence.

41. A method comprising:
receiving an attentional cascade, the attentional cascade being an ordered sequence of detector functions recorded on a machine-readable storage device, the detector functions being functions that when executed by a computer, examine a target image and return a positive result if the target image is a member of a category of objects and a negative result if the target image is not a member of the category of objects, where a positive result from one detector function leads to consideration of the target image by the next detector function and a negative result from any detector function leads to rejection of the target image; and
further training the received attentional cascade to identify specific objects of interest within the category of objects to generate a trained attentional cascade, the trained attentional cascade being an ordered sequence of detector functions that when executed by a computer examine a target image and return a positive result if the target image is one of the specific objects of interest within the category of objects and a negative result if the target image is not one of the specific objects of interest within the category of objects.

42. The method of claim 41, where further training the attentional cascade includes receiving a counter-example set, the counter-example set including images not resembling the specific objects of interest, and training the detector functions using only the example set and the counter-example set, the example set including images resembling the specific objects of interest.

* * * * *